US012791422B2

(12) United States Patent
Vicente Oliveros et al.

(10) Patent No.: US 12,791,422 B2
(45) Date of Patent: Nov. 10, 2026

(54) GAS MONITORING SYSTEM AND AIRCRAFT COMPRISING A GAS MONITORING SYSTEM

(71) Applicant: Airbus Operations S.L.U., Getafe (ES)

(72) Inventors: David Vicente Oliveros, Getafe (ES); Carlos Andres González, Getafe (ES); Guillermo López Reyes, Getafe (ES); Marco Verenanda, Getafe (ES); Jose Antonio Manrique, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 198 days.

(21) Appl. No.: 18/677,360

(22) Filed: May 29, 2024

(65) Prior Publication Data

US 2024/0402036 A1 Dec. 5, 2024

(30) Foreign Application Priority Data

May 31, 2023 (EP) .................................... 23382524

(51) Int. Cl.
*G01M 3/38* (2006.01)
*F17C 13/02* (2006.01)
(Continued)

(52) U.S. Cl.
CPC ............... *G01M 3/38* (2013.01); *F17C 13/02* (2013.01); *G01J 3/44* (2013.01); *G01M 3/04* (2013.01);
(Continued)

(58) Field of Classification Search
CPC ........... G01M 3/38; G01M 3/04; F17C 13/02; F17C 2203/0391; F17C 2203/0629;
(Continued)

(56) References Cited

U.S. PATENT DOCUMENTS

2006/0238741 A1* 10/2006 Ninomiya ................. G01J 3/44 382/106
2009/0257055 A1 10/2009 Chen et al.
2010/0229662 A1* 9/2010 Brower ................. F16L 59/141 138/104
(Continued)

FOREIGN PATENT DOCUMENTS

CN 113588624 A * 11/2021 ............. G01N 21/01
CN 109765468 B 1/2022
(Continued)

OTHER PUBLICATIONS

European Search Report for corresponding European Patent Application No. 23382524.9 dated Nov. 24, 2023.
(Continued)

*Primary Examiner* — Tarifur R Chowdhury
*Assistant Examiner* — Kaitlyn E Kidwell
(74) *Attorney, Agent, or Firm* — Greer, Burns & Crain, Ltd.

(57) ABSTRACT

A gas monitoring system for detecting chemical substances in a gas comprising a Raman spectrometer comprising: an excitation source of light, a hollow core optical fiber having a longitudinal axis, a first longitudinal end, a second longitudinal end, an outer surface and an inner hollow core surface, the hollow core optical fiber being configured to: receive in its hollow core the gas to be monitored, receive at its first or its second longitudinal end light emitted by the excitation source of light, and transmit at its first or its second longitudinal end a Raman light when being illuminated by the received light. The system also includes a detector, and a transmission optical fiber coupled to the first longitudinal end and/or to the second longitudinal end of the hollow core optical fiber.

17 Claims, 4 Drawing Sheets

(51) Int. Cl.

| | |
|---|---|
| ***G01J 3/44*** | (2006.01) |
| ***G01M 3/04*** | (2006.01) |
| ***G01N 21/65*** | (2006.01) |
| ***G02B 6/02*** | (2006.01) |

(52) U.S. Cl.

CPC ......... *G01N 21/65* (2013.01); *G02B 6/02328* (2013.01); *F17C 2203/0391* (2013.01); *F17C 2203/0629* (2013.01); *F17C 2221/012* (2013.01); *F17C 2250/0452* (2013.01); *F17C 2260/038* (2013.01); *F17C 2270/0189* (2013.01); *G01N 2021/651* (2013.01); *G01N 2201/08* (2013.01)

(58) Field of Classification Search

CPC ........ F17C 2221/012; F17C 2250/0452; F17C 2260/038; F17C 2270/0189; G01N 21/65; G01N 2201/08; G01N 2021/651; G01J 3/44; G02B 6/02328

See application file for complete search history.

(56) References Cited

U.S. PATENT DOCUMENTS

2012/0105827 A1* 5/2012 Carter ................ G01N 21/8507
356/51

FOREIGN PATENT DOCUMENTS

| | | | | | |
|---|---|---|---|---|---|
| CN | 114894769 A | | 8/2022 | | |
| CN | 116124696 A | * | 5/2023 | ............. | G01N 21/01 |
| EP | 0780623 A1 | * | 6/1997 | ............ | F17C 13/126 |
| EP | 4127658 B1 | * | 1/2025 | ........... | G01N 21/031 |

OTHER PUBLICATIONS

F. Yang et al., "Towards Label-Free Distributed Fiber Hydrogen Sensor with Stimulated Raman Spectroscopy" Cornell University Library, Feb. 27, 2019.

W. A. de Groot, "The Use of Spontaneous Raman Scattering for Hydrogen Leak Detection" AIAA/SAE/ASME/ASEE Joint Propulsion Conference and Exhibit, vol. AIAA-94-2983; Jun. 27, 1994 (pp. 1-11).

E. Mendoza et al., "Multi-Point Fiber Optic Hydrogen Sensor System for Detection of Cryogenic Leaks in Aerospace Applications" Laser-Based Mirco- and Nanopackaging and Assembly II, vol. 4204; Mar. 1, 2001 (pp. 139-150).

X. Bevenot et al., "Hydrogen Leak Detection Using an Optical Fibre Sensor for Aerospace Applications" Sensors and Actuators B: Chemical, Elsevier BV, NL, vol. 67, No. 1-2; Aug. 10, 2000 (pp. 57-67).

* cited by examiner

GAS MONITORING SYSTEM AND AIRCRAFT COMPRISING A GAS MONITORING SYSTEM

CROSS-REFERENCES TO RELATED APPLICATIONS

This application claims the benefit of European Patent Application Number 23382524.9 filed on May 31, 2023, the entire disclosure of which is incorporated herein by way of reference.

FIELD OF THE INVENTION

The invention relates to the field of monitoring the presence of one or more chemical substances in a gas for leak detection.

BACKGROUND OF THE INVENTION

There are several methods of gas monitoring using fiber optic aided spectroscopy, but sensitivity is highly dependent on the size of the volume under testing.

Raman scattering or Raman effect is the inelastic scattering of photons by matter, meaning that there is both an exchange of energy and a change in the light's direction. Typically, this effect involves vibrational energy being gained by a molecule as incident photons from a visible laser are shifted to lower energy. This is called normal Stokes Raman scattering. The effect is exploited by chemists and physicists to gain information about materials for a variety of purposes by performing various forms of Raman spectroscopy.

Raman spectroscopy is an emerging technology which could be ideally suited for gas concentration monitoring in environments where low intrusivity is required. The downsides of its application at vacuum conditions reside in the low molecular density of gases and weak inelastic scattering processes, which limit the sensibility of the technique to rapid and/or small changes in concentration.

To overcome this issue, in recent years, publications have been presented in which the gas sensing capability of Raman spectrometers is amplified by the use of hollow core optical fibers (HCFs). In brief, hollow core optical fibers are optical fibers comprising an outer surface and an inner hollow core. The inner hollow core allows the transmission of light within an inner hollow core, so that only a minor portion of the optical power propagates in the solid fiber material. As such, hollow core optical fibers provide an enhancement of Raman scattering based on the confinement of excitation light and the analyzed gas within the hollow core of the optical fiber itself, which is therefore used as a gas-filling Raman probe.

Apart from the limitations induced by the propagation loss of a hollow core fibers, which is strongly related to its design and structure, the detection limit of gas decreases by increasing the length of the fiber allowing more interactions between the excitation light and the analyte or gas whose chemical substances are being identified and measured.

Literature provides multiple examples in which hollow core optical fibers of different sizes, in terms of internal diameter and structures, have been developed with the purpose of optimizing the transmission of specific light wavelengths while minimizing the propagation loss.

In detail, two main kinds of optical fibers are generally used. On one hand, there are hollow core optical fibers which implement a reflecting metallic layer coating the inner surface of the inner cylindrical hollow core. This kind of hollow core optical fibers have the advantage of being a relatively simple structure with potentially a large internal diameter (above 100 μm) that facilitates the diffusion of the analyte inside the fiber. On the other hand, this type of fiber usually presents relatively high transmission losses which make it not suitable for applications which require monitoring distances longer than a few meters, typically one or two meters.

On the other hand, a second type of hollow core optical fiber design is such that the analyte and light propagate through a central channel of relatively small diameter (below 100 μm), being confined inside this central channel by a surrounding silica structure that strongly limits propagation losses. The main advantage of the lower propagation losses of these fibers is that it is possible to use longer distance fibers, in the order of tens of meters, which increments the light-analyte interaction further reducing the detection limits of the solution. The immediate disadvantage resides in the gas or analyte diffusion times: being the channel smaller, the gas will take longer time to fill the chamber, increasing the necessary detection times.

The gas diffusion issue is not only limited by the size of the hollow core fiber core, but also because typically only two entry points for the gas are available: the optical fiber ends. The combination of both being the main trade-off of hollow core optical fiber probes given the restricted gas flow which in turn hampers the quick exchange of gases and thus the detection capabilities of the system.

To overcome this issue, researchers have proposed different solutions that facilitate the gas filling of hollow core optical fibers with small cores, typically, below 100 μm. Among them, the most promising method is the fabrication of microchannels along the fiber. Each channel communicates the outer surface and the inner hollow core. The channels allow the monitored gas to enter at a different point in the fiber along its longitudinal axis, thus drastically boosting its filling.

A femtosecond laser has been successfully used to generate rectangular channels in hollow core fibers. As microfabricated channels introduce very low transmission losses, the fabrication of several channels throughout the length of the fiber strongly facilitates gas filling while limiting transmission losses. In this sense, and depending on pressure and environmental conditions, the gas filling time of micro channeled hollow core optical fibers with small cores can be reduced to the orders of minutes.

Previous studies proved the achieved detection limit of gas is several orders of magnitude lower than free-space systems when using hollow core fibers for the detection of chemical substances in gases, while simultaneously allowing the reductions in response time from hours to a few seconds. Furthermore, other publications have shown how the use of different types of hollow core optical fibers has allowed reducing the detection limits to very low concentration, or alternatively, it is possible to reduce the detection times to a few seconds depending on the desired concentration.

Beside the implementation of hollow core optical fibers, further studies show that the detection limit of gases can be lowered by selecting unconventional Raman detection systems.

Typically, Raman spectroscopy uses a laser and a Multi-Channel Detector (MCD) spectrometer providing the capability of distinguishing different chemical substances. It is known in the state of the art that such a solution works in such a way that the polychromatic beam proceeding from the sample passes through a notch filter that separates the Raman emission from the Rayleigh signal and reflected laser signal. Afterwards, the Raman emission is separated by a diffraction grating into its constituent wavelength components. Scattered at different angles, the diffracted light is finally projected onto the long axis of a Charge Coupling Device (CCD) array, which converts the photons received by the pixel grid (each row covering a specific wavelength) into a measurable electronic signal.

Adopting this configuration, the detector is capable of measuring the Raman emission over a broad Raman shift range, generally from 100 to 4000 cm−1, in a single acquisition. Knowing that most Raman signals are emitted within the mentioned range, Multi-Channel Detector (MCD) converts Raman spectrometers into a highly versatile analytical tool that can be used to simultaneously analyze all kinds of Raman active molecules without the need of changing the analytical set-up.

However, for applications in which a limited number of chemical substances need to be analyzed, it is possible to modify the detection system to reduce the detection range to specific spectral regions. To design alternative detection systems for ad hoc applications it would be possible to use Single Channel Detectors (SCD) such as photomultiplier Tubes (PMTs) instead of multi-channel detectors such as Charged Coupled Devices (CCDs).

In a known alternative, the Raman emission is demultiplexed by means of different bandpass filters that are capable of separating certain wavelength ranges into the different single channel detectors, obtaining the wavelength separation at this stage. Although photomultiplier Tubes (PMTs) have a lower quantum efficiency than Charged Coupled Devices (CCDs), <40%, the electron gain ensured by Single Channel Detectors, up to 106 for PMTs, makes them the optimal solution to drastically decrease the detection limit of the spectrometer when traded for versatility.

Additionally, the use of Single Channel Detectors (SCDs) such as photomultiplier Tubes (PMTs) provides further advantages: the extremely lower dark current noise produced on photomultiplier Tubes (PMTs) compared to Charged Coupled Devices (CCD) systems make expensive cooling systems unnecessary in such a proposal, removing an additional complex element from the system.

Furthermore, photomultiplier Tubes (PMTs) are relatively inexpensive and extremely robust compared to Multi-Channel Detectors (MCDs) and the geometry and design of the photomultiplier Tubes (PMT) based solution is less sensitive to loss of calibration due to the dynamic environment of an aircraft, which makes this solution optimal for aeronautic applications, and facilitates the scalability of its production to the industrial scale.

It needs to be underlined that PMTs are not the only Single Channel Detectors (SCDs) that could be used in such a solution: e.g., Silicon Photomultipliers (SiPMs) have also been proposed for Raman applications. Other Single Channel Detector (SCD) could be photodiodes or avalanche photodiodes.

Within the scope of hydrogen gauging and distribution activities, there is a need to implement a system that is capable of measuring chemical substances concentration in gaseous state. This measurement is used for fire prevention or vacuum monitoring activities, among others, within enclosed spaces where leak risk limitation is critical and thus minimum intrusion into the system is required.

In the field of renewable fluid use and storage in aircraft, double-wall liquid hydrogen tanks are known. Said double-wall tanks comprise an inner wall defining an inner chamber configured to house the fluid, liquid hydrogen, and an outer wall which encloses the inner wall. The inner wall and the outer wall are separated by a gap kept at vacuum conditions. There is the need in the aeronautical applications to detect leaks in the vacuum gap.

It is understood by vacuum condition in said gap between the inner wall and the outer wall in a particular embodiments of the double-wall tank be under ultra-high vacuum (UHV) conditions the following: operating pressure is lower than about 100 nanopascals ($1.0\times10^{-7}$ Pa; $1.0\times10^{-9}$ mbar; $7.5\times10^{-10}$ Torr).

All previous works make use of standard or custom optical assemblies to focus the laser beam inside the hollow core fiber, as well as to collect and filter the Raman signal emitted inside the hollow core. As these assemblies require the perfect alignment of multiple lenses, and eventually filters, hollow core optical fiber setups are generally mounted on optical benches and their reliability as gas probes for Raman spectrometers is generally tested under strictly controlled laboratory environment, where external stressors, for example, vibration, temperature and pressure variations, are prevented or minimized.

In spite of the existence of all the innovations described in the state of the art, there is no system that describes the design of a Raman system based on the use of hollow core optical fibers that is robust enough to withstand structural validation testing for aeronautic components, while fulfilling the low intrusivity requirements. This is the reason why, even though multiple laboratory setups proved to effectively detect trace analytes of aeronautical interest, for instance, hydrogen, within a reasonable time, none of the current state-of-the-art solutions have ever been applied to aeronautical applications.

As such, current state-of-the-art solutions are not feasible for aeronautical applications, as their delicate integrity would not withstand the structural qualification tests, for instance, thermal and vibration assays, that all aerospace components need to pass for certification purposes. Moreover, each of these elements of the prior art exist independently of each other, and not in combination.

Furthermore, these optical setups are generally composed of multiple mechanical components that occupy relatively large volumes. This aspect makes it difficult to integrate them into the enclosed spaces envisaged in aeronautical applications, where the low intrusivity of the sensors is a mandatory requirement.

SUMMARY OF THE INVENTION

As previously stated, coupling a hollow core optical fiber to a Raman spectrometer works well in a laboratory environment where the operator can optimally position and align the hollow core optical fiber to the spectrometer. However, such systems are not viable for aeronautical applications, which require an integrated and robust system that has to provide optimal performance. The aeronautical environment is distinguished by external stresses, vibrations, accelerations, temperature changes, etc., which are not experienced in a working environment.

The gas monitoring system object of the invention makes it possible to detect very low concentrations and allows the system to be mounted and operated in an aeronautical environment, i.e., subjected to vibrations, acceleration variations, significant thermal gradients, etc.

The system object of the invention also substantially increases the effective volume under testing to the point where interactions between light and gas are facilitated, and sensibility and reliability of the measurements are improved.

The system object of the invention is an end-to-end solution centered around the use of lens-less coupling to obtain a robust and compact system based on a hollow core optical fiber for a fast detection, in the order of few seconds, of gases at low concentration using Raman spectroscopy and non-invasive light applications. Therefore, the system object of the invention allows to detect leaks of a gas at very low concentrations.

The gas monitoring system object of the invention detects, i.e., determines the presence of chemical substances, for instance, $N_2$, $H_2$ and $O_2$ in a gas, for example, in a vacuum chamber.

The gas monitoring system object of the invention comprises the following elements:

A Raman spectrometer comprising:

an excitation source of light configured to illuminate the gas to be monitored, a hollow core optical fiber having a longitudinal axis, a first longitudinal end, a second longitudinal end, an outer surface and an inner hollow core surface, the hollow core optical fiber being configured to:

receive in its hollow core the gas to be monitored, receive at its first or its second longitudinal end the light emitted by the excitation source of light, transmit at its first or its second longitudinal end a Raman light generated by the gas to be monitored when being illuminated by the received light, and a detector configured to receive the Raman light transmitted by the hollow core optical fiber.

A transmission optical fiber coupled to the first longitudinal end and/or to the second longitudinal end of the hollow core optical fiber. The transmission optical fiber being configured to guide the light emitted by the excitation source of light to the hollow core optical fiber and/or to guide the Raman light transmitted at the first or the second longitudinal end of the hollow core optical fiber towards the detector.

Thus, the light emitted by the excitation source of light may be guided or, what is the same, directed by a transmission optical fiber to an end of the hollow core optical fiber and/or the Raman light generated at the hollow core optical fiber is transmitted, i.e., sent out from one of the longitudinal ends of the hollow core optical fiber and be guided by a transmission optical fiber towards the detector.

Therefore, the transmission optical fiber guides the light from the excitation source to the hollow core optical fiber and/or guides the Raman light emitted by the analyte from the hollow core optical fiber towards the detector. Transmission optical fibers may include both, hollow core optical fibers as well as standard glass fibers, $SiO_2$, or any other glass material used on optical fibers. This element allows to perform long-distance analysis which is an advantage in the aeronautical field.

Raman light is understood as a light emitted by molecules of the gas to be monitored by Raman scattering of the light emitted by the excitation source of light.

The hollow core optical fiber and the transmission fiber are coupled together, i.e., are joined by any means, for instance, by gluing or splicing, i.e., by overlapping and securing together the two ends.

The excitation source is typically a laser which could work at different emission wavelengths ranging from the ultraviolet (UV) region to infrared wavelengths, with power maximum of few Watts. All kinds of laser technologies can be considered as an excitation source: Gas Lasers, Solid-State Lasers, fiber Lasers, Liquid Lasers (Dye Lasers), Semiconductor Lasers (Laser Diodes) or any other. The excitation laser will be used to generate the Raman emission by illuminating or exciting the analyte material.

The hollow core optical fiber is placed within the volume that is intended to be tested. The gas analyte to be measured fills the interior of the fiber, its hollow core, and is subjected to the light coming from the excitation source. The gas to be monitored enters the hollow core optical fiber at openings in the hollow core fiber, for example, at the first end and/or the second end which are open.

The hollow core optical fiber receives, and guides said light from the excitation source within its hollow core. Hollow core optical fibers of any type could be used, including metallic coating hollow core optical fibers or photonic bandgap fibers in any configuration, including revolver-like hollow core optical fibers.

The detector is a device adapted to analyze the light collected by the system. The detector will gather the Raman emission light emitted by the analyte. Any type of light spectrometer, spectrograph, spectrophotometer in any configuration, transmission, reflection or any other, can be used for this means using also any kind of detector capable of acquiring the emitted Raman photons. Depending on the frequency of the excitation source, the Raman scattering occurs at different wavelength ranges, any detector in the range from UV to infrared wavelengths would be suitable for the system of the invention. This includes mainly, but not restricted to, Charged Couple Devices (CCD) and Complementary Metallic Oxide Semiconductor (CMOS). Single couple devices (SCDs) would have the advantage of being more robust in conditions of vibrations and accelerations, thus having an advantage in case of applications on-board an aircraft.

Also, an object of the invention is an aircraft that comprises:

a hydrogen tank comprising an inner wall defining an inner chamber configured to house hydrogen and an outer wall which encloses the inner wall, the inner wall and the outer wall being separated by a vacuum gap configured to be kept at vacuum conditions, a gas monitoring system according to any preceding claim, the hollow core optical fiber being located within the vacuum gap, the detector and the excitation source of light being located outside the vacuum gap.

When a vacuum is monitored, the hollow core optical fiber has the advantage that, as the diffusion of any gas in a vacuum is fast, it diffuses quickly in the hollow core fiber so that a vacuum leak can be detected early. Thus, the efficiency of the hollow core optical fiber increases when it is used to monitor a gas leak inside a volume under vacuum, for instance, hydrogen leak or an air leak in the gap kept at vacuum conditions between the inner wall and the outer wall of a liquid hydrogen tank.

In hydrogen tank applications, the detection of $H_2$ in the gap kept at vacuum conditions between the inner wall and the outer wall indicates leakage from the inner wall and the detection of $N_2$ or $O_2$ indicates leakage from the outer wall.

Given the very long distances between the hollow core optical fiber and the excitation source of light and/or the detector that are in aircraft applications, it is necessary to consider the Raman response of the fiber itself, the transmission efficiency for different excitation wavelengths as a function of distance and the coupling/mating of different fibers. The transmission efficiency of the available hollow core fibers shows that they present transmission losses, plus they show signal of the confined gas inside the hollow core fiber. It means that this signal should be taken into consideration for the detection of the actual hollow core fiber filled with the gas to be monitored. So, even if the signal from the hollow core fiber is expected to be lower than that of the conventional fused-silica fiber, in any case the Raman signal emitted by the fiber will have to be dealt with either by filtering and or calibration.

In this application, in the case of the SiO2 fibers since the N2, H2 and O2 lines do not overlap in general with the most intense Raman bands of the SiO2 signals, while on the hollow core fibers the potential signals from the trapped air in the fiber will directly interfere with O2 and N2 lines. Taking all this into consideration, conventional SiO2 fibers may be the preferred option for long-distance transmission, leaving hollow core fibers being filled with the gas to be monitored. This solution facilitates the long distance which would not be possible using conventional state-of-the-art solutions.

Thus, when having long distances a high contribution of the fiber to the Raman signal can be expected due to the spectrum generated by the fiber itself. This is why solutions where there are many meters of fiber after the optical system are usually not considered. However, according to the above, in the system of the invention, which is mainly focused on the detection of gases such as H2, N2 and O2, the influence of the fiber can be ruled out due to the very nature of the emitted signals as they do not overlap with the fiber signal.

Implementing light-guiding solutions based on optical fibers as part of the system to guide and filter the light is critical to facilitate the feasibility of the solution on aeronautic applications. This kind of long-distance analysis by Raman spectroscopy is unprecedented in the typical laboratory or industrial applications where Raman spectroscopy is used. The combination of transmission optical fibers for guiding the light coupled to the hollow core fibers to perform the analysis has been found to be optimal taking into consideration the transmission losses due to dozens of meters of optical fiber.

According to the above, the system object of the invention is a compact and robust solution to focus the excitation light into the hollow core fiber and to collect Raman signal emitted inside the hollow core fiber. The system of the invention integrates the excitation source, the light transmission fibers, the hollow core optical fiber and the detector. To this end, this would be a system that enables this type of technology to be carried on-board an aircraft.

The system object of the invention unlike most/all other known systems, avoids the use of optical elements such as conventional lenses and filters. This invention overcomes the limitations related to the use of optical assemblies. Thus, it avoids the use of conventional optical elements such as filters, dichroic, lenses, doublets, triplets, objectives, mirrors and collimators.

The above is a great advantage for use in aeronautics, which allows the development of a more compact and more robust system which makes it more resistant to the typical stresses of an aircraft, such as vibrations, thermal variations, etc. Furthermore, the use of long optical fibers allows the Raman excitation and detection system to be located many meters away from the hollow core fiber, which would facilitate the integration of such a system in an aircraft. Thus, the system object of the invention, through the connection by optical fibers, the excitation source, the hollow core optical fiber and the detector can be located many meters away from the hollow core optical fiber to be placed inside the interrogator volume. This facilitates the overall management and monitoring of the gas detection system, thus further facilitating its application to aeronautics.

BRIEF DESCRIPTION OF THE DRAWINGS

To complete the description and to provide for a better understanding of the invention, a set of drawings is provided. Said drawings form an integral part of the description and illustrate preferred embodiments of the invention. The drawings comprise the following figures.

DETAILED DESCRIPTION OF THE PREFERRED EMBODIMENTS

Figure 1:
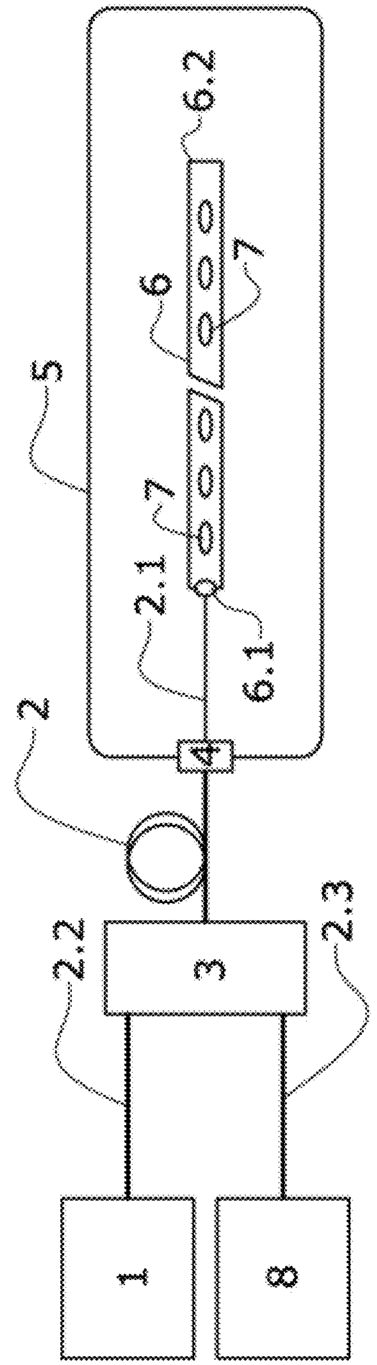
FIG. 1 shows a schematic representation of a first embodiment of the invention.

As previously stated, the gas monitoring system object of the invention comprises a Raman spectrometer comprising:

- an excitation source of light (1) configured to illuminate the gas to be monitored,
- a hollow core optical fiber (6) having a longitudinal axis, a first longitudinal end (6.1), a second longitudinal end (6.2), an outer surface (6.4) and an inner hollow core surface (6.3), the hollow core optical fiber (6) being configured to:
- receive in its hollow core the gas to be monitored,
- receive at its first or its second longitudinal end (6.1, 6.2) the light emitted by the excitation source of light (1),
- transmit at its first or its second longitudinal end (6.1, 6.2) the Raman light generated by the gas to be monitored when being illuminated by the received light, and
- a detector (8) configured to receive the Raman light transmitted by the hollow core optical fiber (6).

In addition, the gas concentration monitoring system object of the invention further comprises a transmission optical fiber (2) coupled to the first longitudinal end (6.1) and/or to the second longitudinal end (6.2) of the hollow core optical fiber (6) and configured to guide the light emitted by the excitation source of light (1) to the hollow core optical fiber (6) and/or to guide the Raman light transmitted at the first or the second longitudinal end (6.1, 6.2) of the hollow core optical fiber (6) towards the detector (8).

Figure 2:
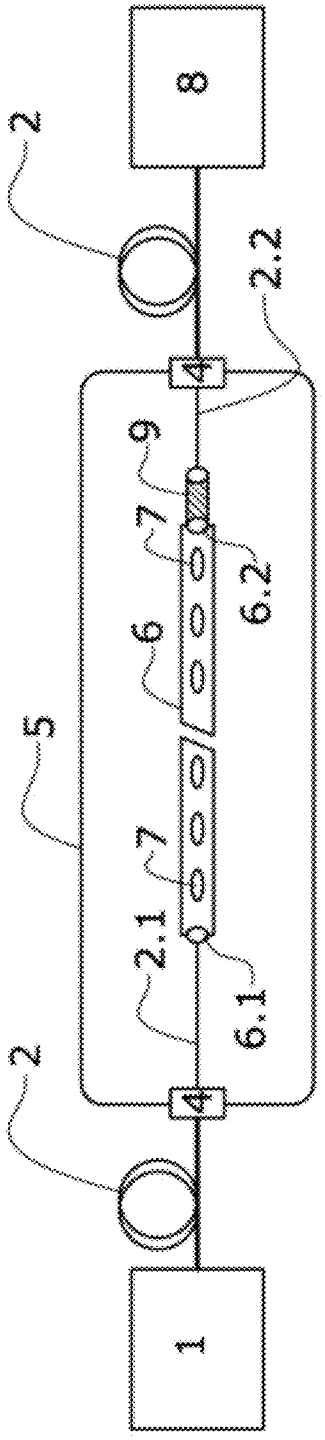
FIG. 2 shows a schematic representation of a second embodiment of the invention.

Two embodiments of the invention are depicted in FIGS. 1 and 2. The embodiments are lens-less configurations.

Figure 3:
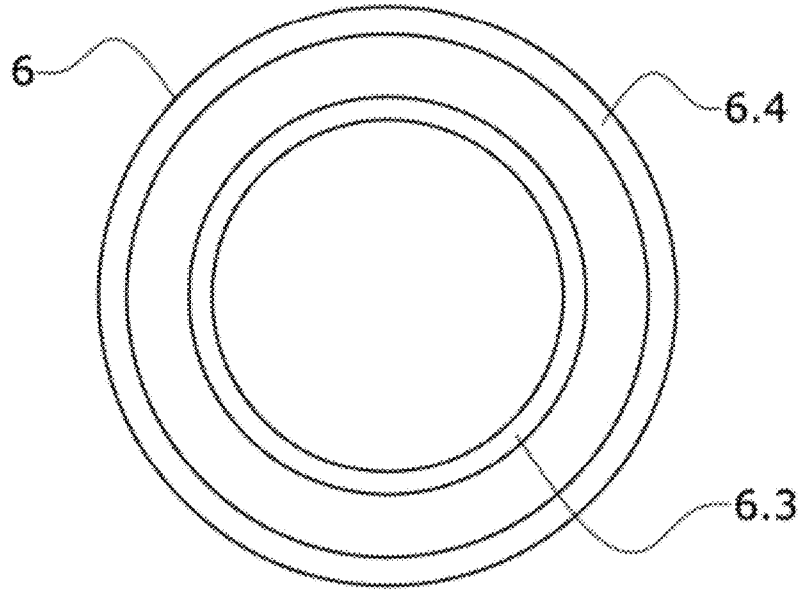
FIG. 3 shows a cross section of a hollow core optical fiber with a metallic coating.

FIG. 3 depicts a hollow core optical fiber (6) that comprises an outer surface (6.4) and an inner hollow core surface (6.3). It implements a reflecting metallic internal cylindrical hollow core which confines the light thanks to the metallic coating on the inner hollow core surface (6.3).

Figure 4:
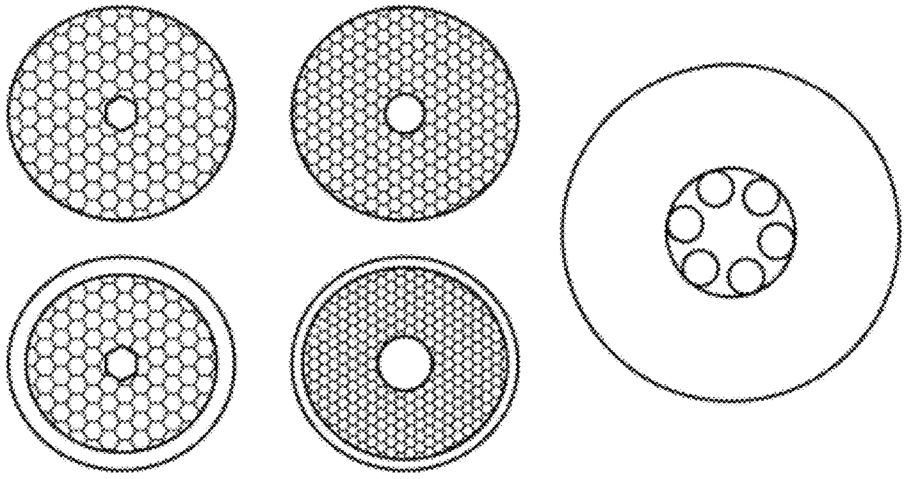
FIG. 4 shows a cross section of four photonic bandgap fibers and a revolver like hollow core optical fiber.

FIG. 4 depicts four embodiments of a photonic band gap optical fiber comprising a central hollow core surrounded by a complex silica structure that strongly limits propagation losses. A revolver channel hollow core fiber is also depicted on the right side of the figure.

Figure 5:
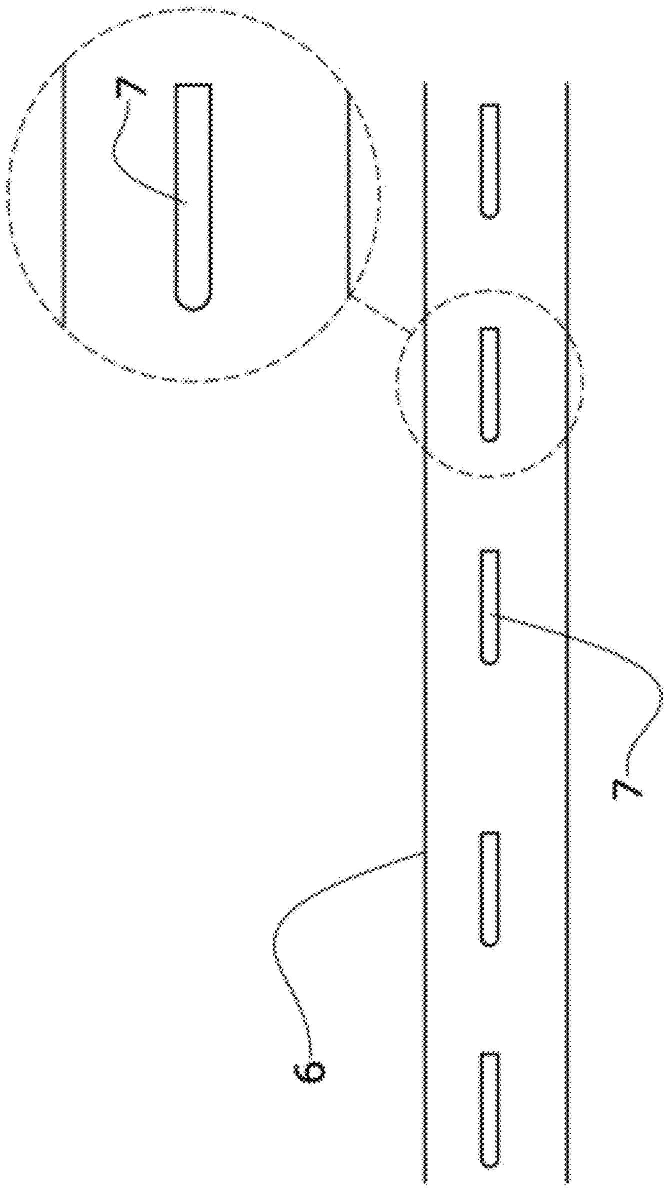
FIG. 5 shows a plan view of an embodiment of a portion of a hollow core optical fiber comprising channels along its longitudinal axis.

In order to facilitate the diffusion of the analyte, these fibers could, but not necessarily need to, comprise channels (7), i.e., cuts or holes, of any size located along the longitudinal axis of the optical fiber. Channels (7) are depicted in FIGS. 1, 2 and 5. These channels (7) facilitate the diffusion of the gas inside the hollow core optical fiber (6), thus decreasing the detection time. Each channel (7) communicates the outer surface (6.4) and the inner hollow core surface (6.3) of the optical fiber such that the hollow core optical fiber (6) is configured to receive the gas to be monitored through the channels (7). Thus, the gas to be monitored may enter the hollow core optical fiber (6) at the first longitudinal end (6.1) and/or the second longitudinal end (6.2) and/or through the channels (7). Each channel (7) is being configured to allow the gas to enter the hollow core optical fiber (6) at different points along the longitudinal axis of the hollow optical fiber (6).

The hollow core optical fiber (6) of the embodiments disclosed in FIGS. 1 and 2 comprises channels (7) along its longitudinal axis. Therefore, the gas to be monitored enters the core of the hollow core optical fiber (6) through the longitudinal open ends (6.1, 6.2) and through the channels (7).

The dimensions of the channels (7) depend on the internal diameter of the hollow core optical fiber (6) used, and the geometry of the channel (7). If the channel (7) has a circular cross-section, the diameter is generally less than 100 μm. If the channel (7) has a rectangular cross-section, the long side can be up to 500 μm.

In an embodiment, the channels (7) have a longitudinal axis perpendicular to the longitudinal axis of the hollow core optical fiber (6).

In an embodiment, the hollow core optical fiber (6) has a set of 50×500 channels (7) placed between 0.1 cm and 10 cm between them along the longitudinal axis of the hollow core optical fiber (6).

Preferably, the channels (7) on the hollow core optical fiber (6) are performed in a large internal diameter, greater than 200 μm. Generally, this method is only applied to hollow core fibers (6) with an internal diameter of less than 100 μm. This greatly facilitates gas diffusion in the fiber, which greatly reduces detection times compared to conventional solutions.

The larger the section of the hollow core optical fiber (6), the larger the channel (7) diameter, which increases the gas diffusion velocity within the hollow core optical fiber (6) thus facilitating rapid detection of the analytes.

The first embodiment, depicted in FIG. 1, comprises the following elements:

- the excitation source of light (1),
- the hollow core optical fiber (6) having the first longitudinal end (6.1) and the second longitudinal end (6.2). The hollow core optical fiber (6) receives at its first longitudinal end (6.1) the light emitted by the excitation source of light (1) and also transmits the Raman light,
- the detector (8),
- a first transmission optical fiber (2.1) coupled to the first end (6.1) of the hollow core optical fiber (6).

In addition, it comprises a Raman probe (3), for instance, placed close to the excitation source of light (1). The Raman probe (3) includes a set of optical components, for instance mirrors, filters, dichroic mirror, that allows to separate the laser source from the Raman signal, so that only the latter reaches the detector (8).

Thus, the gas concentration monitoring system disclosed in FIG. 1 further comprises:

- a Raman probe (3),
- a first transmission optical fiber (2.1) coupled to the first end (6.1) of the hollow core optical fiber (6) and to the Raman probe (3),
- a second transmission optical fiber (2.2) being coupled at one end to the Raman probe (3) and being coupled to the excitation source of light (1) at its other end, and,
- a third transmission optical fiber (2.3) coupled to the Raman probe (3) at one end being and being coupled to the detector (8) at its other end.

The application object of the invention and shown in FIG. 1 discloses a vacuum gap (5) of a double-wall liquid hydrogen. Said vacuum gap (5) is the enclosure to be monitored.

In an embodiment, the transmission optical fiber (2) and the hollow core optical fiber (6) are coupled inside the vacuum gap (5). In an alternative, the transmission optical fiber (2) and the hollow core optical fiber (6) are coupled at the outer wall of the vacuum gap (5).

In FIG. 1, the hollow core optical fiber (6) is placed inside the vacuum gap (5) and the transmission optical fiber (2) is coupled to the hollow core optical fiber (6) inside the vacuum gap (5).

In addition, in the embodiment of FIG. 1, the transmission optical fiber (2.1, 2.2) is coupled at the outer wall of the vacuum gap (5) or tank to a transmission optical fiber (2) located outside the vacuum gap (5).

In an embodiment, the transmission optical fiber (2) is coupled to the inner surface of the hollow core optical fiber (6) by splicing or gluing, thus enabling a lens-less coupling.

Thus, an effective coupling is achieved by fiber optic splicing, or by gluing, among others, so that the optic fiber transmitting the excitation and/or emission light is joined to the inner surface of one of the two ends of the hollow core fiber (6).

The splicing may be achieved by means of direct fiber feed-throughs, through fiber connectors, feed-through flanges, optical windows of any type compatible with any wavelength from UV to infrared, or any other means to facilitate the transmission of light through the wall of the enclosed volume to be analyzed.

In the embodiment disclosed in FIG. 1, the transmission optical fiber (2) enters the vacuum gap (5) by means of a fiber-to-fiber feedthrough (4) (MM/MM) which allows breaching the vacuum gap (5) by the diameter of the transmission optical fiber (2).

Preferably, outer diameter of the transmission optical fiber (2) is smaller than the diameter of the inner surface of the hollow core optical fiber (6) so that the end of the hollow core fiber (6) serves as entrance for both the excitation light and the gas to be monitored.

In an embodiment, the outer diameter of the hollow core optical fiber (6) is greater than 200 μm.

In the embodiment of FIG. 1, the hollow core fiber (6) has an internal diameter of 500 μm, so that this of the fiber allows both light transmission and analytes diffusion.

In the shown embodiment, the collected light is transmitted using the same 200 μm MM transmission fiber (2) used for the transmission of the excitation light. The Raman probe (3) filters the residual signal of the laser (Rayleigh emission) and guides the Raman emission through the collection optical path. The collected light is analyzed by the detector (8), for instance, a transmission spectrometer with CCD detector cooled to −60° C.

A multimode MM fiber of similar diameter to the hollow core optical fiber (6) may be used to maximize the light collection even if there are some additional losses in the excitation.

The development of a detection system based on single channel detectors (8) allows to obtain a more robust and more sensitive system towards the detection of specific analytes ($H_2$, $N_2$ and $O_2$).

The second embodiment, depicted in FIG. 2, would use both ends (6.1, 6.2) of the hollow core optical fiber (6), one for excitation and another one for transmission of the Raman light, thus optimizing the collection of the Raman signal and decreasing detection times. For both embodiments, a long transmission optical fiber (2) is used to connect the hollow core optical fiber (6) to the excitation source of light (1) and to the detector (8), so that these two embodiments can be placed far away from the hollow core fiber (6) performing the monitoring of the gas.

Thus, the second embodiment, depicted in FIG. 2, comprises the following elements:

- the excitation source of light (1),
- the hollow core optical fiber (6) having the first longitudinal end (6.1) and the second longitudinal end (6.2). The hollow core optical fiber (6) receives at its first longitudinal end (6.1) the light emitted by the excitation source of light (1) and transmit the Raman light at its second longitudinal end (6.2),
- the detector (8),
- a first transmission optical fiber (2.1) coupled to the first end (6.1) of the hollow core optical fiber (6).
- a second transmission optical fiber (2.2) coupled to the second end (6.2) of the hollow core optical fiber (6).

It further comprises a filter (9) coupled between the second end (6.2) of the hollow core optical fiber (6) and the second transmission optical fiber (2.2). The aim of the filter (9) is to prevent the radiation source and the Rayleigh scattering to reach the detector, so that only the Raman scattering is measured.

By proposing the use of hollow core optical fibers (6) with channels (7), gas diffusion issues are addressed improving the detection capabilities of the system. It will also facilitate the coupling of the hollow core optical fiber (6) to the transmission optical fiber (2) not impairing the gas diffusion capabilities thanks to the diffusion through the channels (7).

The application object of the invention and shown in FIG. 2 also discloses a vacuum gap (5) constituting a thermal insulation of a double-wall hydrogen tank. The transmission optical fibers (2) and the hollow core optical fiber (6) are coupled inside the vacuum gap (5). The hollow core optical fiber (6) is placed inside the vacuum gap (5) and the transmission optical fibers (2) are coupled to the hollow core optical fiber (6) by means of a fiber-to-fiber feedthrough (4) which allows breaching the vacuum gap (5) by the diameter of the transmission optical fiber (2).

Again, a laser is used as excitation source of light (1). The excitation light is transmitted using a conventional single mode (SM) glass transmission fiber (2), with a diameter of, for example, 9 μm, towards the vacuum gap (5) to be monitored. The excitation light is coupled inside the hollow core optical fiber (6) placed inside the vacuum gap (5) by means of a fiber-to-fiber feedthrough (4) (SM/SM) which allows breaching the vacuum gap (5) by the diameter of the fiber.

The SM transmission fiber (2) is joined to the inner surface of the hollow core optical fiber (6) of the first end (6.1) of the hollow core optical fiber (6) by splicing or gluing, thus enabling a lens-less coupling.

The hollow core optical fiber (6) has an internal diameter of 500 μm, so that this fiber allows light transmission and maximize analytes diffusion. The hollow core optical fiber (6) has a set of 50×500 microns channels (7) placed between 0.1 and 10 cm along the longitudinal axis of the hollow core optical fiber (6).

A MM transmission optical fiber (2), with for instance, an inner core of 400 μm, is coupled to the second end (6.2) of the hollow core optical fiber (6) by splicing or gluing thus enabling an in-line, lens-less filtering of the residual signal of the laser (Rayleigh emission). The Raman emission is guided to the exterior of the vacuum gap (5) by means of a fiber-to-fiber feedthrough (MM/MM) (4) which allows breaching the vacuum gap (5) by the diameter of the fiber. The collected light is transmitted using a conventional MM glass fiber towards the detector (8). The collected light is analyzed by the detector (8), a transmission spectrometer with a cooled CCD detector (8) cooled to −60° C.

In the second embodiment single mode transmission fibers (2) are used so that excitation is maximized thanks to a better numerical aperture match, while collecting at the other end with a suitable diameter.

As previously stated, solutions known in the state of the art achieve low detection limits with long acquisition times, for instance of the order of minutes. The system of the invention allows equivalent detection limits to be achieved but in shorter times, specifically in the order of seconds. This represents an enormous advantage for aeronautical applications where gas detection has to be carried out as quickly as possible. The reduction of acquisition times is achieved by a combination of multiple technological solutions, including the perforation of the hollow core fiber (6) and the use of more efficient detection systems compared to conventional CCDs.

By proposing the use of alternative detection systems for ad hoc applications using Single Channel Detectors (SCD) such as photomultipliers Tubes (PMTs) instead of multichannel detectors such as Charged Coupled Devices (CCDs), the overall sensibility of the proposed detection system can be increased while reducing its demand for resources (weight, power). The use of such a system in combination with hollow core fibers (6) provides detection advantages compared to existing solutions.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

a hydrogen tank comprising an inner wall defining an inner chamber configured to house hydrogen and an outer wall which encloses the inner wall, the inner wall and the outer wall being separated by a vacuum gap configured to be kept at vacuum conditions; and a gas monitoring system for detecting chemical substances in a gas, the system comprising:

a Raman spectrometer comprising:

an excitation source of light being located outside the vacuum gap and configured to illuminate a gas to be monitored, a hollow core optical fiber having a longitudinal axis, a first longitudinal end, a second longitudinal end, an outer surface and an inner hollow core surface, the hollow core optical fiber being configured to be located within the vacuum gap and being configured to:

receive in the hollow core optical fiber the gas to be monitored, receive, at the first or the second longitudinal end, a light emitted by the excitation source of light, transmit, at the first or the second longitudinal end, a Raman light generated in the hollow core optical fiber by the gas to be monitored when being illuminated by a received light, a detector being located outside the vacuum gap and configured to receive the Raman light transmitted by the hollow core optical fiber, and a processor configured to receive a detected signal from the detector and determine constituents of the gas to be monitored from the detected signal, wherein the processor is further configured to determine leakage from the inner wall from detection of $H_2$ and leakage from the outer wall from detection of $N_2$ or $O_2$;

a transmission optical fiber coupled to the first longitudinal end, the second longitudinal end, or both longitudinal ends of the hollow core optical fiber and configured to guide the light emitted by the excitation source of light to the hollow core optical fiber, or to guide the Raman light transmitted at the first or the second longitudinal end of the hollow core optical fiber towards the detector, or both, wherein the transmission optical fiber is directly coupled to an inner surface of the hollow core optical fiber in a lens less configuration.

2. The aircraft according to claim 1, wherein the hollow core optical fiber comprises channels communicating the outer surface and the inner hollow core surface such that the hollow core optical fiber is configured to receive the gas to be monitored through the channels.

3. The aircraft according to claim 2, wherein the channels have a longitudinal axis perpendicular to the longitudinal axis of the hollow core optical fiber.

4. The aircraft according to claim 1, wherein the transmission optical fiber is coupled to the inner surface of the hollow core optical fiber at a location adjacent the outer wall of the hydrogen tank.

5. The aircraft according to claim 1, wherein the transmission optical fiber and the hollow core optical fiber are coupled by gluing or splicing.

6. The aircraft according to claim 5, wherein the transmission optical fiber and the hollow core optical fiber are spliced with direct fiber feed-throughs, fiber connectors, feed-through flanges, or optical windows.

7. The aircraft according to claim 1, wherein the first longitudinal end of the hollow core optical fiber is configured to receive the light emitted by the excitation source of light and to transmit the Raman light generated by the gas to be monitored and the transmission optical fiber comprises a first transmission optical fiber is-coupled to the first longitudinal end of the hollow core optical fiber.

8. The aircraft according to claim 7, wherein the gas monitoring system further comprises:

a Raman probe, the first transmission optical fiber being coupled to the Raman probe, wherein the transmission optical fiber further comprises:

a second transmission optical fiber being coupled at one longitudinal end to the Raman probe and being coupled at its other longitudinal end to the excitation source of light, and, a third transmission optical fiber being coupled at one longitudinal end to the Raman probe and being coupled at its other longitudinal end to the detector.

9. The aircraft according to claim 1, wherein the transmission optical fiber comprises:

a first transmission optical fiber coupled to the first longitudinal end of the hollow core optical fiber and configured to guide the light emitted by the excitation source of light to the hollow core optical fiber, and, a second transmission optical fiber coupled to the second longitudinal end of the hollow core optical fiber and configured to guide the Raman light transmitted at the hollow core optical fiber towards the detector.

10. The aircraft according to claim 9, further comprising:

a filter coupled between the second longitudinal end of the hollow core optical fiber and the second transmission optical fiber.

11. The aircraft according to claim 1, wherein the gas monitoring system is adapted to monitor a gas comprising $N_2$, $H_2$, $O_2$, and combinations thereof.

12. The aircraft according to claim 1, wherein the transmission optical fiber and the hollow core optical fiber are coupled at the outer wall of the hydrogen tank.

13. The aircraft according to claim 1, wherein the transmission optical fiber comprises a first transmission optical fiber inside the vacuum gap, wherein the hollow core optical fiber is coupled to the first transmission optical fiber.

14. The aircraft according to claim 13, wherein the first transmission optical fiber is coupled at the outer wall of the hydrogen tank to the transmission optical fiber located outside the vacuum gap.

15. The aircraft according to claim 1, wherein the transmission optical fiber and the hollow core optical fiber are coupled by at least one fiber feed-through selected from direct fiber feed-throughs, fiber connectors, feed-through flanges, or optical windows.

16. The aircraft according to claim 1, wherein a first longitudinal end of the hollow core optical fiber is configured to receive the light emitted by the excitation source of light, a second longitudinal end of the hollow core optical fiber is configured to transmit the Raman light to the detector, and the gas monitoring system further comprises a spectral filter coupled between the second longitudinal end of the hollow core optical fiber and the detector, the spectral filter being configured to suppress excitation light.

17. The aircraft according to claim 1, wherein the transmission optical fiber is spliced or glued directly to the inner surface of the hollow core optical fiber without intervening optical elements.

* * * * *